W. H. GRANGER
April 28, 1931. PRINTING PRESS UNIT Re. 18,056
Original Filed April 10, 1926
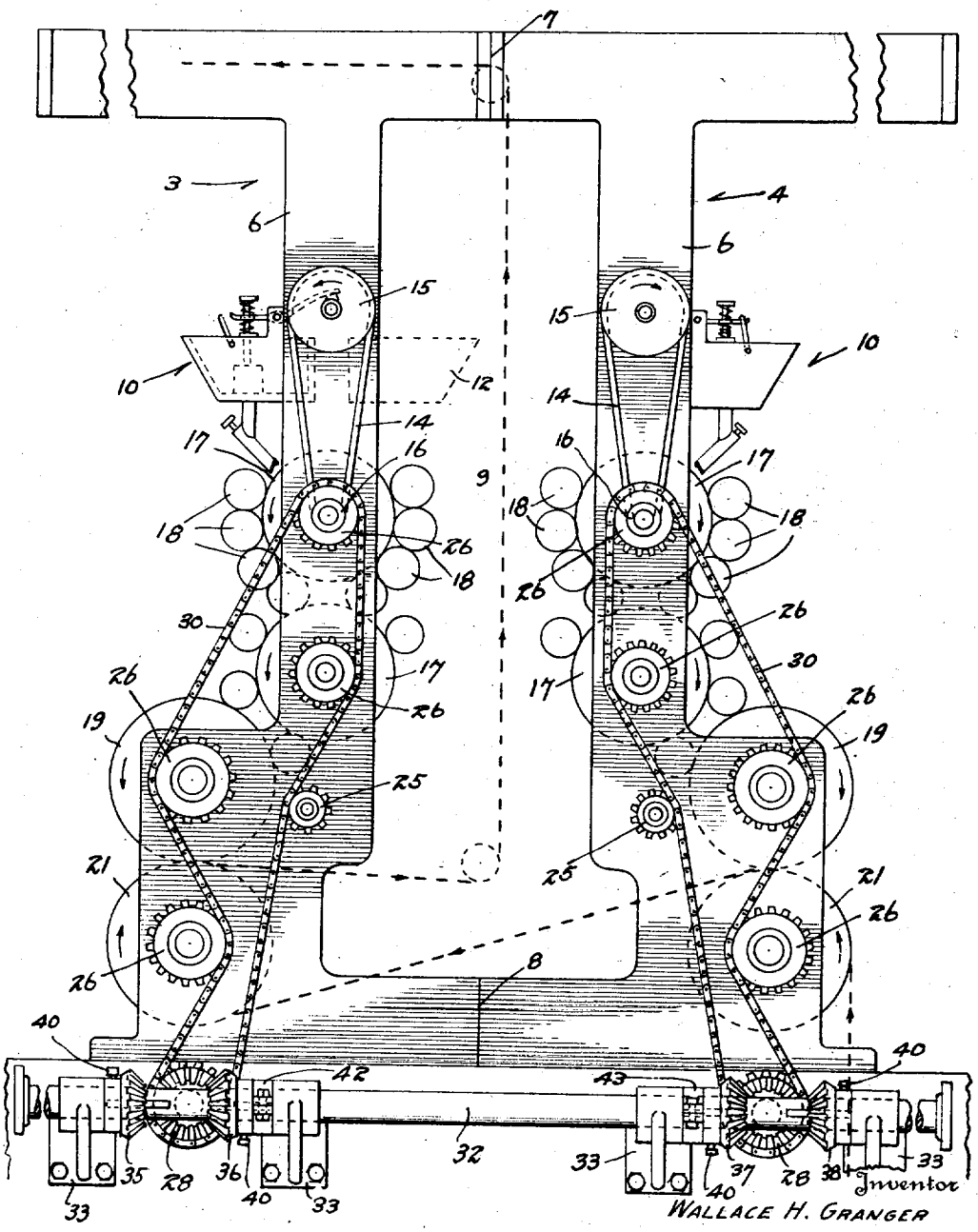
Inventor
WALLACE H. GRANGER
By
Attorneys.

Reissued Apr. 28, 1931 Re. 18,056

UNITED STATES PATENT OFFICE

WALLACE H. GRANGER, OF SAN FRANCISCO, CALIFORNIA

PRINTING-PRESS UNIT

Original No. 1,680,018, dated August 7, 1928, Serial No. 101,192, filed April 10, 1926. Application for reissue filed May 21, 1929. Serial No. 364,924.

This invention pertains to printing presses.

An object of my present invention is the provision of a printing press in which certain parts are more advantageously disposed than in previous printing presses.

Another object of my invention is the provision of a printing press which may be operated and repaired in a more expeditious and safer manner than has previously been accomplished.

Another object of this invention is the provision in a unit printing press comprising two half units, each having cylinders thereon, and means for driving the cylinders of each half unit independently and in either the same direction or in opposed directions.

With the foregoing objects in view, together with such other objects and advantages as may subsequently appear, this invention resides in the construction and arrangement of parts hereinafter described and claimed, and illustrated in the accompanying drawings, in which is shown a printing press unit in side elevation.

Referring to the drawing for more detailed description thereof, the printing press unit comprises two half units 3 and 4 respectively. These units are alike and comprise frames 6 which are separate but which abut each other at the vertical lines 7 and 8. The space 9 between the vertical members of the frames 6 is wide enough to allow a pressman to work freely therein. A floor may be provided on the bottom horizontal members of the frame 6 for the pressman working in the space 9.

On the outer sides of the frames 6 ink fountains 10 may be disposed. These ink fountains are described and claimed in my co-pending application, Serial No. 92,932 filed Mar. 6, 1926.

An ink fountain 12, as shown in dotted lines, may be disposed on the inner side of either or both frames 6 if desired. The extra ink fountain 12 may be provided for use when the half-unit is being changed from an ink of one color to an ink of another color. For example, if black ink has been used for printing and has been dispensed from the ink fountain 10 from the half unit 3, the fountain 12 may be put into operation when it is desired to use an ink of a color other than black.

The ink fountains, according to my present invention, instead of being placed below the impression cylinders as in previous presses, are placed substantially at the normal level of the pressman so that he may the more quickly observe or work on the same. By placing the ink fountains above the impression cylinders the web lead is shortened and paper lint, which formerly fell from the paper into the ink fountains, may not foul the ink in the fountains.

The ink fountains are adapted to be actuated by belts 14 mounted on wheels 15 at their upper ends, and on wheels 16 at their lower ends. Ink drums or cylinders 17, which are fed by the ink fountains 10, are mounted on the frame 6 of the units 3 and 4, and are provided with ink distributing rollers or trains 18. Plate cylinders 19 are disposed opposite each other in the half units 3 and 4 and are disposed below the ink drums 17.

Below the plate cylinders 19 are disposed impression cylinders 21, disposed opposite each other in the half units 3 and 4. Although the plate cylinders 19 are shown in the drawing as being the same diameter as the impression cylinders 21, they may be made smaller if desired. It will be noted that the plate cylinders 19 are above the impression cylinders 21.

It will be noted that the impression cylinders and plate cylinders are at the outer sides of the unit and are readily accessible to the pressman. The position of these cylinders is such that the pressman may lead paper therebetween without being in danger of having his hands caught between the cylinders, as in machines of previous constructions.

Idler gears 25 are provided in each of the half units 3 and 4, and sprocket wheels 26 are provided on the ink drums, plate cylinders, and impression cylinders in each half unit.

Rotatably mounted wheels 28 are provided for each half unit 3 and 4, these wheels being a combination of beveled gears and sprocket wheels. A chain 30 is provided for each half unit 3 and 4 to drive the inking cylinders, plate cylinders, and impression cylinders, the chain engaging the sprocket wheels 26 for this purpose, and being arranged in a serpentine path to give the cylinders or drums the desired rotation.

It is sometimes necessary to rotate the cylinders or drums of both half units in the same direction, while in other cases the cylinders or drums of one unit should be run in a direction opposite to the corresponding cylinders or drums of the other unit.

It is also sometimes desirable to shut down one half unit while running the other half unit. To these ends I provide means whereby the cylinders and drums of one half unit may be rotated independently of the drums and cylinders of the other half unit and whereby the drums and cylinders of both half units may be rotated in either direction.

The mentioned means comprises a drive shaft 32 rotatable in brackets 33 on which are mounted beveled gears 35 and 36 for the half unit 3 and beveled gears 37 and 38 for the half unit 4. The beveled gears 35 to 38 inclusive have splined connections with the shaft 32 so that they may be moved back and forth on the shaft into and out of engagement with the beveled gears 28. Set screws 40 are provided for securing the beveled gears 35 to 38 inclusive at desired positions on the shaft.

In the drawings the removable collar 42 is positioned between the beveled gear 36 and a bracket 33 and is disposed around the shaft 32. With the collar 42 in the position shown, the beveled gear 36 is in engagement with the beveled gear 28 so that the beveled gears and drums of the half unit 3 are rotated in the direction shown by the arrows on the drums and cylinders. When it is desired to reverse the direction of rotation of the drums and cylinders of the half unit 3, the collar 42 may be removed and the beveled gear 36 moved on the shaft towards the right, out of engagement with the beveled gear 28. The beveled gear 35 may be then moved towards the right into engagement with the beveled gear 28 and the collar 42 placed between the left end of the beveled gear 35 and the adjacent bracket 33.

A removable collar 43 is positioned between the left end of the beveled gear 37 and the adjacent bracket 33. With the collar 43 in such position, the beveled gear 37 engages the gear 28 so that the cylinders and drums in the half unit 4 are rotated in the direction shown by the arrows on the drums and cylinders.

It will be noted from the drawing that the web paper is fed upwardly between the two mechanisms. It will further be noted that the right hand mechanism, for example, will print on the side of the web that can be viewed by the operator standing on the right side while the press is in motion. This permits the flow of ink to be regulated and the operator to check the printing while regulating the device. If the printing is light, this will show on the web, and the quantity of ink fed to the ink drums may be increased. The quantity of ink may be cut down if the operator sees that the printing on the web is too heavy.

In like manner, the printing on the left hand side of the web when looking at the figure is accomplished by the mechanism on the left, and the operator can glance at the completed printing while adjusting the flow of ink from the ink fountain 10.

When it is desired to reverse the direction of motion of the drums and cylinders in the half unit 4, the collar 43 may be removed from the position shown in the drawing. The gear 37 is then moved on the shaft 32 towards the left, out of engagement with the gear 28, and the gear 38 is moved into engagement with the gear 28 and the collar 43 placed between the right end of the gear 38 and the adjacent bracket 33.

While I have described one embodiment of my invention, modifications thereof may be readily devised without departing from the spirit of my invention, and it is to be understood that such modifications come within the scope of the appended claims.

I claim:

1. A printing press unit comprising two identical frames abutting each other at the top and bottom of the frames for providing a passageway between the frames, an impression cylinder and a plate cylinder carried by each frame and an ink fountain carried by each frame, and being disposed at approximately the height of a person when standing, said cylinders being disposed adjacent to the bottom of said frames and on the outer sides thereof.

2. A printing press unit comprising two identical frames, an impression cylinder and a plate cylinder carried by each frame, and an ink fountain carried by each frame, and being disposed at approximately the height of a person when standing, said cylinders being disposed adjacent to the bottom of said frames and on the outer sides thereof.

3. A printing press unit comprising two sets of frames spaced apart and of a sufficient height to permit a person to walk therebetween while standing erect, each set of frames carrying an impression cylinder and a plate cylinder, the top of the plate cylinder being disposed substantially hip high when the person is standing erect, ink cylinders carried by each set of frames, and being disposed above said first named cylinders, and at such a height as to permit them to be washed by an operator while in standing position, said impression and plate cylinders being disposed substantially above one another for permitting the person to readily see both cylinders at their point of contact while he feeds a web of paper therebetween.

4. A printing press unit comprising two sets of frames spaced apart and of a sufficient height to permit a person to walk therebetween while standing erect, each set of frames carrying an impression cylinder and a plate cylinder, the top of the plate cylinder being disposed substantially hip high when the person is standing erect, ink cylinders carried by each set of frames and being disposed above said first named cylinders, and at such a height as to permit them to be washed by an operator while in standing position, said impression and plate cylinders being disposed substantially above one another for permitting the person to readily see both cylinders at their point of contact while he feeds a web of paper therebetween, an ink fountain carried by each set of frames and being disposed substantially shoulder high when the person is standing erect.

5. A printing press unit comprising confronting sets of ink fountains and distributing trains, confronting sets of plate and impression cylinders, and frames having base portions and oppositely disposed offset portions respectively carrying the cylinder sets and the fountain and train sets, spacing the cylinder sets farther apart than the fountain and train sets when assembled in unit formation.

6. A plurality of frames assembled to compose a printing press, a complete assemblage of ink distributing and printing mechanisms mounted on each frame, a separate flexible drive on each frame, trained tortuously to become the common actuator of all of the respective mechanisms, and a longitudinal drive shaft extending along and being common to all of the frames, having driver means to selectively operate the separate flexible drives.

7. A printing press unit having coacting plate and impression cylinders superposed to aline the parallel axes in a common vertical plane, ink distributing mechanism including ink drums having the parallel axes alined in a common vertical plane offset from that of the plate and impression cylinders, and an ink fountain supplying the uppermost ink drum, being situated at a lower altitude by virtue of the offsetting of said distributing mechanism than if said mechanism were situated above said plate and impression cylinders.

8. A printing press unit having coacting plate and impression cylinders, ink distributing mechanism, including ink drums stationed in an approximately upright position to be accessible to an operator standing on the floor and in operative relationship to said cylinders but so positioned that the axial plane of the drums will not conflict with the axial plane of the cylinders, thus establishing said drums in off-set relationship to the plate cylinder to expose approximately one-half the circumference of said plate cylinder, and an ink fountain supplying the uppermost ink drum, being situated at a lower altitude by virtue of the off-setting of said drums, hence also accessible to said operator.

9. A printing press unit having two confronting similar half sections wherein the web of paper is led from below the unit, coacting plate and impression cylinders, ink distributing mechanism for each half section and including ink drums having the approximate major plane assuming a direction entirely clearing the periphery of the plate cylinder thus disposing said distributing mechanism in offset relationship to said cylinder, and an ink fountain supplying the uppermost ink drum of each half section and being situated at a lower altitude by virtue of the offsetting of said distributing mechanism.

10. A newspaper printing press comprising two symmetrical printing sections, each having coacting printing and impression cylnders contacting each other, said impression cylinder being disposed near the floor, and a separate offset inking mechanism for each set of cylinders, means for feeding a web of paper from one set of cylinders to the other so as to cause the paper to be printed on both sides, said web being fed upwardly from the cylinders and passed between the inking mechanisms, whereby the operator is enabled to adjust the flow of ink while checking the result of the adjustment by the amount of ink on the web as it passes the inking mechanism.

11. A newspaper printing press unit composed of two confronting similar half sections wherein a web of paper is fed upward from below the unit, each half section having an impression cylinder, means for guiding the web of paper upward between the half sections of the unit after it has left the impression cylinders, an inking mechanism including ink drums disposed at the top of each half section, and means for turning the web of paper over the inking mechanism of one of the half sections of the unit so that the paper continues in a direction at right angles to the axes of the ink drums.

12. A newspaper printing press unit composed of two confronting similar half sections wherein a web of paper is fed upward from below the unit, each half section comprising a plate cylinder, an impression cylinder, and ink drums, the impression cylinder being disposed at a lower elevation than the plate cylinder and the plate cylinder at a lower elevation than the ink drums, all of the elements of each half section being in a substantially upright position, means for leading a web of paper upward from below the unit to one of the impression cylinders, then to the impression cylinder in the other half unit, the printed web of paper passing upward from the last impression cylinder and between the half sections of the unit, and means for leading the printed web of paper over the inking drums of one of the half sections of the unit so that the paper continues in a direction at right angles to the axes of the inking drums.

13. A newspaper printing press unit comprising confronting sets of ink fountains and distributing trains, confronting sets of plates and impression cylinders, and frames having base portions and oppositely disposed offset portions respectively carrying the cylinder sets and the fountain and train sets, spacing the plate cylinders farther apart than the train sets when assembled in unit formation.

14. A printing press unit having coacting plate and impression cylinders superimposed to aline the parallel axes in a substantially vertical plane, ink distributing mechanism including ink drums having the parallel axes alined in a substantially vertical plane offset from that of the plate and impression cylinders, and an ink fountain supplying the uppermost ink drum, being situated at a lower altitude by virtue of the offsetting of said distributing mechanism than if said mechanism were situated above said plate and impression cylinders.

WALLACE H. GRANGER.